Jan. 6, 1942.   R. S. MORSE   2,269,161
COLOR PHOTOGRAPHY
Filed May 18, 1938   3 Sheets-Sheet 1

TO PROCESSING

RICHARD S. MORSE
INVENTOR
BY
ATTORNEYS

Jan. 6, 1942. R. S. MORSE 2,269,161
COLOR PHOTOGRAPHY
Filed May 18, 1938 3 Sheets-Sheet 2
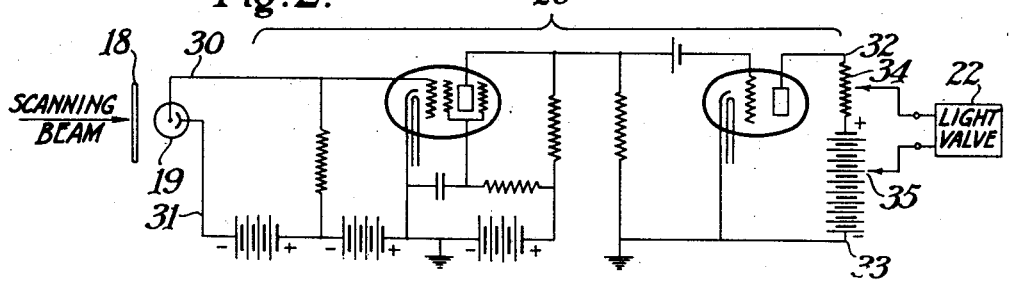
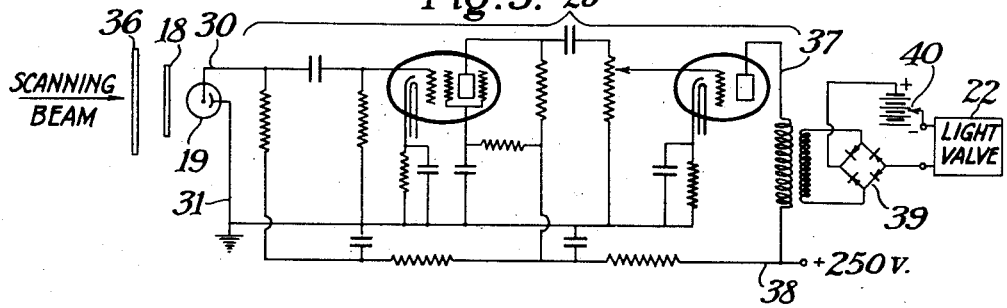
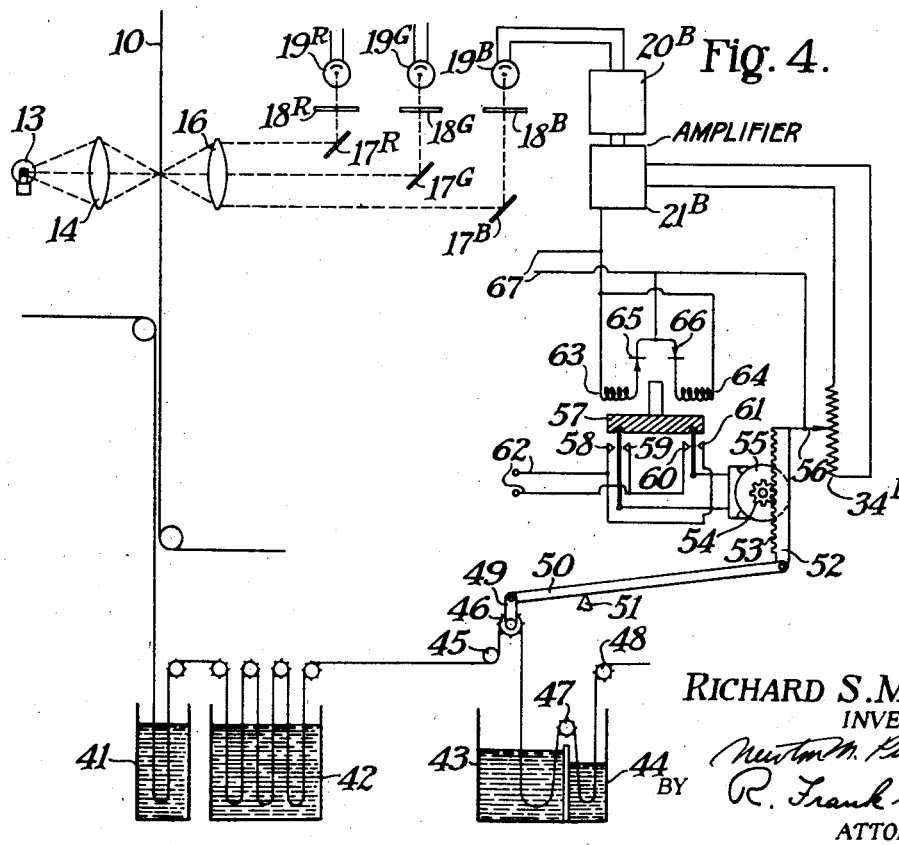
RICHARD S. MORSE
INVENTOR
BY
ATTORNEYS

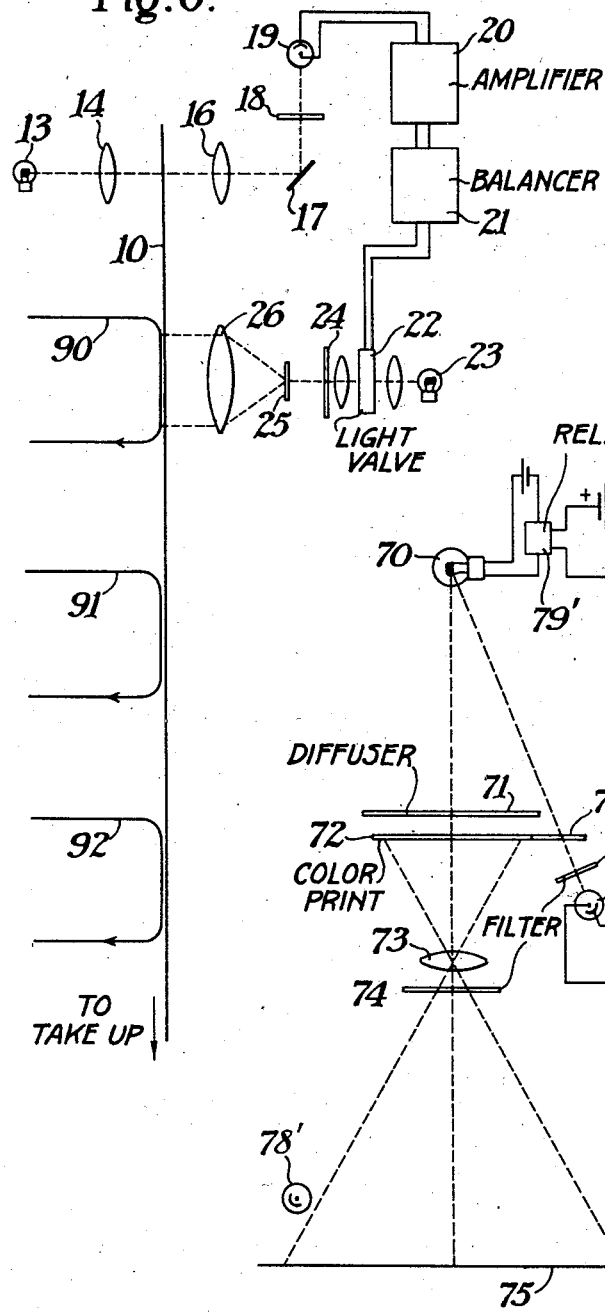
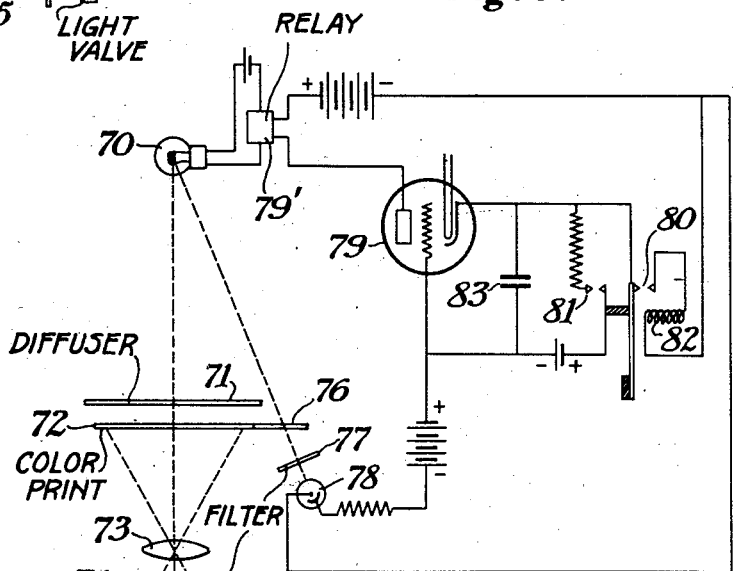
Fig. 6.
Fig. 5.
Richard S. Morse
INVENTOR
BY
ATTORNEYS

Patented Jan. 6, 1942

2,269,161

UNITED STATES PATENT OFFICE 2,269,161

COLOR PHOTOGRAPHY

Richard S. Morse, Rochester, N. Y., assignor to Eastman Kodak Company, Rochester, N. Y., a corporation of New Jersey Application May 18, 1938, Serial No. 208,632

22 Claims. (Cl. 95—2)

This invention relates to color photography and particularly to the making of duplicates of color motion picture films.

It is an object of the invention to correct for errors in the colors of a color photograph when making a reproduction of this photograph.

More specifically, the invention relates to three color photography and has for its objects to correct for errors due to the color temperature, i. e. the departure from white light, of the original illumination, to correct for shifts of color balance due to over or underexposure, to correct for errors in relative sensitivity of the three sensitive layers and/or to correct for shifts of color balance due to errors in processing, all of which are errors in the steps of making the original photograph.

Broadly, the invention has for its object the correction of errors when reproducing by any color process such as a monopack, screen, lenticular, imbibition or wash-off relief process, a multicolor photograph made by any of these processes. More particularly, the present invention is most useful in the reproduction by a monopack process or an imbibition process of a positive or negative photograph made by a monopack process.

According to the invention, correct color rendition of an original subject is provided by photographing the subject and simultaneously photographing a gray or neutral object by the same illumination and processing the two images by the same method. The two images must of course be made on materials and processed under conditions which materials and conditions are identical as far as any effect on color balance is concerned. The term "identical" as used in the accompanying claims is intended to convey just the sense in which it is used here. Any departure of the photograph of the original from a correct rendition of the appearance it would have in white light due to errors in illumination or in processing, which latter errors include those introduced by adjustment of the reversal exposure, cause a similar departure of the record of the gray or neutral colored objects from the desired gray or neutral color. This latter departure is noted and a correction therefor is introduced in reproducing the photograph of the original.

Since the first photograph may be a negative or a positive, the phrase "a correct rendition of" is used to include negative as well as positive rendition whereas the phrase could be entirely omitted if only the duplicating of a positive is concerned. Also in the present specification and the accompanying claims, the term "reproducing a photograph" is used to include "duplicating a positive photograph" and "printing a positive from a negative photograph." Similarly a full color photograph may be either positive or negative whereas a natural color photograph can only be a positive. Either term distinguishes from monotone photographic images.

According to a simplified embodiment of the invention, wherein correction for errors in processing only are required, the gray or neutral colored record on the film may be produced by a flash exposure to a gray or neutral colored light.

More specifically the invention consists of placing on the original film or a similar film, a record of a gray or neutral colored light which may be due to a flash exposure or to a gray object adjacent to the original subject. In the case of motion picture film this gray or neutral colored record is placed adjacent to the picture areas, i. e. between the picture areas and the perforations of the film or between the perforations and the edge of the film. This gray record is then scanned by the three primary colors each of which is transmitted or reflected from the record to photoelectric cells which through suitable electric circuits are used to control the relative intensities of the final images in a reproduction of the photograph. Usually, the three beams are not separate until after the record has been scanned, i. e., a single white beam scanning the record is divided by a beamsplitter and suitable filters into three primary colored beams.

This control of the relative intensities of the final positive images may be provided by a light valve or similar means for controlling the relative amounts of the primary colors used in the printing or duplicating light. On the other hand the control may be provided by allowing the output of the photoelectric cells to control the time of development, the temperature of the developer or the concentration of the developer, affecting the corresponding color. When the reproduction is made by a process involving separate color separation negatives, the control of the color balance of the printing light consists specifically in controlling the relative exposures of the three negatives. This control of exposure may be obtained by controlling the intensity of the printing light or by controlling the time of the printing exposure. In the case of motion picture films, the control of intensity rather than of time of exposure is more useful. The control of the intensity of an image "in accordance with" some other factor includes, direct, inverse, linear and/or non-linear control. Similarly, "inversely may be either linearly or non-linearly." For clarity, some of the theory underlying the invention and the definitions of some of the terms used in this specification and the accompanying claims will be briefly outlined.

"White light" is usually taken to mean daylight and it has been found that color pictures are most satisfactory when they have an appearance approaching that which the original subject would have when illuminated by white light, independent of the actual illumination of the original subject. Exceptions to this general rule need not be considered here. However, the broad statement that an object is reproduced as it would appear under white light will be taken to mean that the color rendition is the correct one which may or may not be slightly different from that corresponding to the appearance of the object when illuminated by white light. In arranging color balance to get this proper rendering, the color of the light by which the reproduction is to be viewed must be taken into account. For example, motion pictures to be projected by an arc lamp require a different color balance than those to be projected by tungsten light.

A gray object or a gray light is one whose color appears gray to the average eye and contains equal proportions measured in suitable units of the three primary colors, red, green, and blue. The units employed must take into account the various factors such as the relative responses of the human eye and other theoretical considerations which need not be discussed here. For the purposes of the present invention, the object or light used in producing the record which is to be scanned and which is to control the color correction need not be exactly gray but necessarily must include large proportions of each of the three colors and hence those colors which are slightly off gray such as tan, etc., may be used. Although the term "neutral" is sometimes taken in its strict sense to mean only gray, it will be used in the present specification and the accompanying claims to include those colors which are slightly off of gray and for which the spectral distribution is known. It is not uncommon for merchandisers of colored articles to use the term neutral in this general sense.

In three color photography, three color separation negatives corresponding to the primary colors are usually made and then corresponding positives are made from these. Wash-off relief processes follow this procedure directly. Monopack processes have the negatives in superimposed layers at some stage of the processing and the positives are made by a reversal process the negatives being destroyed thereby. Some monopack processes are strictly negative positive processes rather than reversal processes. In lenticular and in screen processes the negatives and positives are made up of juxtaposed elements. In any case the final color print consists of three color separation positives in register either superimposed or juxtaposed. There are also well-known differences between subtractive and additive processes, but the above terminology appears to be sufficiently complete to describe the more useful applications of the present invention.

Of course, the invention can well be applied to direct positive processes involving no stage wherein separation negatives can be said to exist. It is also useful in making a positive print to correct for errors in a negative color photograph of an original. However, its greatest use is in duplicating, by a process effectively involving negatives at some stage, a positive photograph made by a similar process.

The present invention will be fully understood from the following description of certain embodiments of it when read in connection with the accompanying drawings, in which:

Fig. 2 shows a D. C. amplifying circuit suitable for use with the invention.

Fig. 3 shows an A. C. amplifying circuit suitable for use with the invention.

Fig. 4 shows an embodiment of the invention wherein the time of one of the processing steps is controlled.

Fig. 5 shows an embodiment of the invention wherein the time of printing exposure is controlled.

Fig. 6 illustrates the invention as applied to the duplicating of a monopack film by an imbibition or similar process involving separate color separation negatives.

Figure 1:
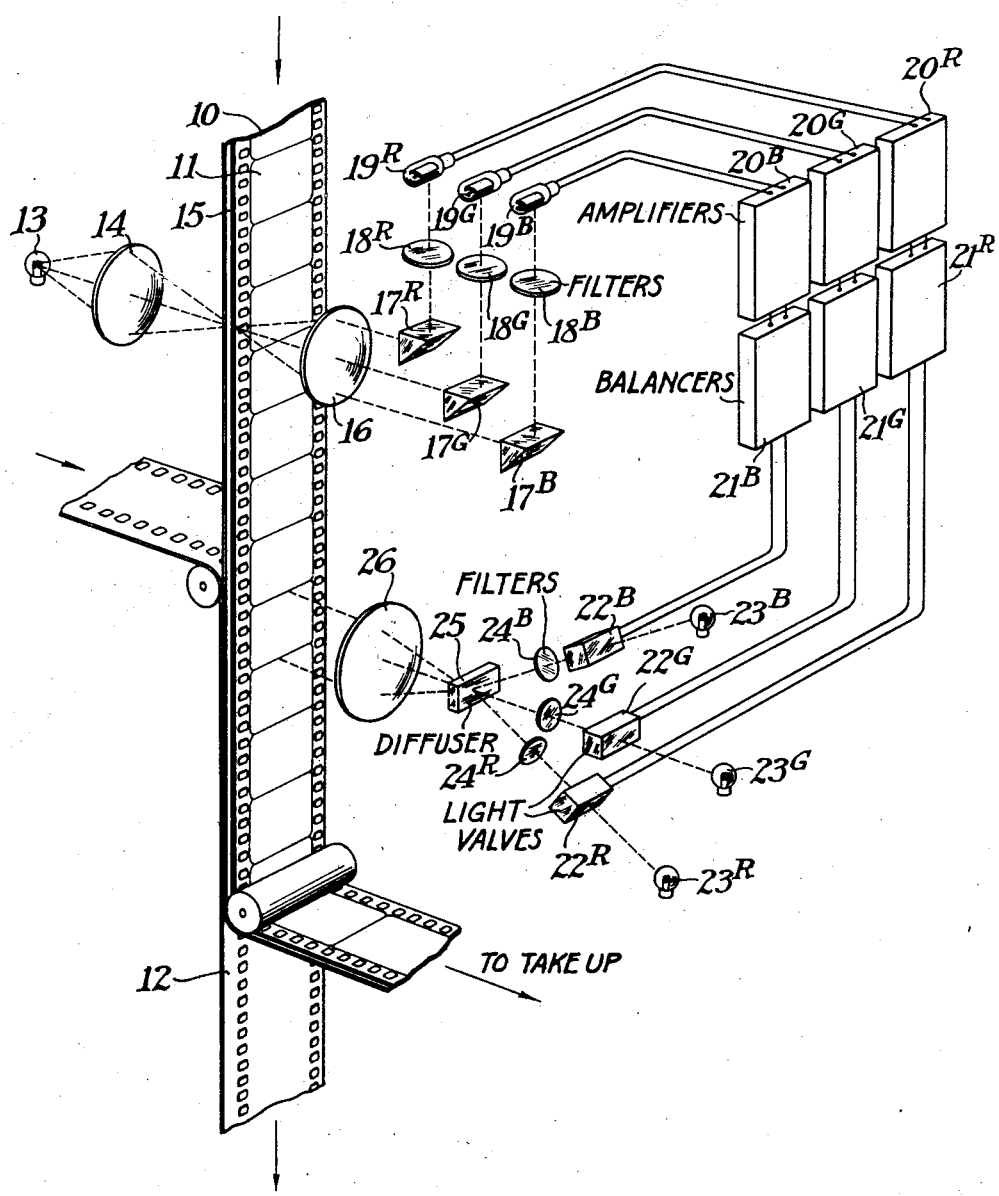
Fig. 1 shows an embodiment of the invention wherein the quality of the duplicating light is controlled.

In Fig. 1 a color motion picture film 10 bearing a series of color pictures 11 is reproduced on a similar film 12. The color processes used for films 10 and 12 need not be exactly the same. Adjacent to the pictures 11, the film 10 is provided with a track or record 15 which was printed thereon before the processing of the film 10. This record 15 may be printed by the image of a gray or neutral colored object placed adjacent to the original subject or by a flash exposure to a white or neutral colored light of known spectral distribution. If, due to the processing, or when a gray object is illuminated by the same light as the original, due to the color of the illumination, the color balance in the pictures 11 is not correct, e. g. is too red, the record 15 will not be a correct rendition of the gray or neutral color and in the example mentioned will be too red. If the film 10 is a negative one and too red, the print 12 will be printed correctly by increasing the amount of red therein either by increasing the amount of red in the printing light or as will be discussed in connection with Fig. 4 by increasing the red (i. e. decreasing the blue-green in a subtractive process) in the processing. If the film 10 is a positive one and too red, the duplicate 12 will be made correctly by decreasing the amount of red therein.

The record 15 is scanned by the three primary colors by means of a suitable optical system shown as a light source 13, lenses 14 and 15, a beam splitter comprising prisms 17R, 17G, 17B and color filters 18R (red) 18G (green), and 18B (blue). The relative intensities of the scanning beams, i. e. the colors from the original are used to control the quality of the duplicating or printing light. The beams fall respectively on photoelectric cells 19R, 19G, and 19B which through suitable electric circuits including amplifiers 20B, 20G, and 20R and balancers 21B, 21G, and 21R control the light valves 22R, 22G, and 22B respectively. These light valves control the relative proportions of the three primary colors in the duplicating or printing light. For this purpose, a light source with a suitable beam splitter or three light sources as shown 23R, 23G, and 23B are provided along with the corresponding color filters 24R, 24G, and 24B and illuminate a diffusing medium 25 which thus acts as a light source of controlled spectral energy distribution.

This light source 25 together with suitable optical systems shown as a lens 26 forms the printing or duplicating light.

Thus when the pictures 11 are too red, the record 15 is too red which causes the photoelectric cell 19R to set up an electrical energy in excess of normal which (when the pictures 11 are positive) closes down the light valve 22R and reduces the amount of red in the light source 25 and when the pictures 11 are negative opens the valve 22R to increase the red in the printing light source 25.

The electric circuits which control the light cells in accordance with the electrical energies set up by the photoelectric cells 19R, etc., are provided with suitable adjustments whereby a correct color rendition in the record 15 gives the correct quality to the color of the secondary light source 25. In Fig. 2, the electrical energy set up as a difference of potential across the points 30 and 31 is amplified by a suitable direct current amplifier and produces across the points 32 and 33 a potential which is modified according to the intensity of the scanning beam. A suitable portion of this potential is taken off at the points 34 and 35 to operate a light valve 22 which may be of any suitable type such as a ribbon valve, a diaphragm, a galvanometer or any of the suitable devices used in recording sound on film.

If the advantages of A. C. amplification are desired, an interrupter 36 as shown in Fig. 3 may be placed in the scanning beam and an A. C. amplifier 20' may be used to produce an A. C. potential across the points 37 and 38 modulated in accordance with the intensity of the scanning beam. Through a rectifier 39 and an adjusting means shown as a variable potential 40, this electrical energy is used to operate the light valve 22.

Fig. 4 is similar to Fig. 1 and shows the manner in which the output of the photoelectric cells may be used to control the time of processing. The balancer circuit 21B including the potentiometer circuit 34B supplies zero potential when there is a normal blue component in the record 15. An increase or decrease of the blue component causes a positive or negative output from the balancer 21B which through a contact 56 engaging the resistance 34B and through electro-magnets 63 and 64 and rectifiers 65 and 66 operates a double pole double throw switch including a magnetically operated bar 67 and contacts 58, 59, 60 and 61. When there is a zero output from the balancer 21B, the member 57 remains in a neutral position permitting no current to pass through a reversing motor 55 attached thereto. A positive output from the balancer 21B throws the switch in one direction and current through leads 62 from a suitable D. C. supply causes the motor 55 to rotate in one direction, and vice versa. The motor 55 operates a rack 53 and pinion 54 which moves a lever 52 up and down. One end of this member 52 carries the contact 56 so that after the motor has rotated a certain amount the balance in the balancer circuit 21B will be again established and the switch 57 will move to the neutral position causing the motor to stop.

The other end of the member 52 through a lever 50 pivoted at a fulcrum 51 carries a connecting arm 49 which raises and lowers a sprocket wheel 46.

The film 12 which is to form the final duplicate passes through suitable processing baths 41, 42, 43, 44, etc. In the example shown, the processing vat 43 is the one which controls the intensity of blue in the final image. If there is an excess of blue in the original pictures 11 and hence in the track 15, a correction for this may be introduced in duplicating or printing by controlling, i. e. either increasing or decreasing the amount of time in the bath 43. If the original pictures 11 are negative and a positive print is being made therefrom, the processing must be arranged to increase the amount of blue in the print, i. e. decrease the amount of yellow in a subtractive process. Fixed sprockets 45, 47, and 48 which drive the film through the processing vats are arranged so that as the film passes over these sprockets and over the movable sprocket 46, the time which the film is in the bath 43 is controlled by the height of the sprocket 46. Numerous equivalent methods of controlling the time may alternatively be used. The present invention is not specifically concerned with this detail.

If it is also desired to control the quality of the printing light, this may be done through leads 67 in exactly the same manner as shown in Fig. 1. This dual control is often necessary since changing one of the factors only is not always sufficient to give the desired results.

Although the invention is not primarily concerned with the reproduction of still color photographs and although the advantages such as continuous automatic control are not present in this case, Fig. 5 illustrates how the invention may be applied to the making of still duplicates and shows one feature which is particularly useful in this case, namely that the control may be applied to the control of time of exposure. In this Fig. 5, a light source 70 through a suitable optical system including a diffuser 71, a lens 73 and a color filter 74, prints a color separation negative 75 from a color photograph 72. The color photograph 72 is provided with a gray portion 76 through which light from the lamp 70 passes through a color filter 77 and therethrough to a photoelectric cell 78. The output of this photoelectric cell 78 controls the time of exposure by turning off the lamp 70 after it has been on for a sufficient time. Alternatively, the photoelectric cell 78 may be placed at the position 78' to receive light from the gray portion 76 through the lens 73 rather than directly, but this is less practical because of the loss of light. In operating the device, the lamp 70 is turned on through a relay 79' by closing a switch 80 which is held closed by an electro-magnet 82. At the same time a switch 81 is opened so that the output of the photoelectric cell 78 is used to establish a charge on a condenser 83 which is across the grid of an electron discharge device 79 which operates the relay 79'. When the charge on the condenser 83 reaches a certain value, the valve 79 ceases to pass current and through the relay 79' turns out the lamp 70 and de-energizes the magnet 82 thereby releasing the switch 80 and closing the switch 81 through which the discharge from the condenser 83 leaks away, thus returning the whole of the electric circuit to its original state.

Fig. 6 illustrates an extremely useful embodiment of the invention wherein a monopack film 10 is duplicated by an imbibition process in which separate color separation negatives are made on sensitive films 90, 91 and 92. The elements of this circuit are similar to those shown in Fig. 1 and the arrangement is identical thereto except that the color separation negatives are printed separately in Fig. 6 and are printed simultaneously on the monopack film 12 in Fig. 1.

Having thus described the invention and the preferred embodiments with which it may be practiced, I wish to point out that it is not limited to the arrangements shown but is of the scope of the appended claims.

What I claim and desire to secure by Letters Patent of the United States is:

1. The method of reproducing a multi-colored photograph prepared by a predetermined process which comprises preparing by the same process with identical materials and identical processing conditions an approximately full color photographic record of light of known spectral distribution, noting the departure of the record from a correct rendition of said distribution, reproducing said photograph and controlling the relative amounts of the primary colors in the reproduction in accordance with the amount of said departure.

2. The method of duplicating a multi-colored positive photograph prepared by a predetermined process which comprises preparing by the same process with identical materials and identical processing conditions an approximately natural color photographic record of a neutral colored light of known spectral distribution, noting the departure of the record from said neutral color, duplicating said photograph and controlling the relative amounts of the primary colors in the duplicate in accordance with the amount of said departure.

3. The method of printing a positive from a multi-colored negative photograph prepared by a predetermined process which comprises preparing by the same process with identical materials and identical processing conditions an approximately full color negative photographic record of a neutral colored light of known spectral distribution, noting the departure of the record from a correct negative rendition of said neutral color, printing the positive and controlling the relative amounts of the primary colors in the print in accordance with the amount of said departure.

4. The method of reproducing a multi-colored original as it would appear in white light which comprises preparing a colored photograph of the original under given illumination conditions and by a predetermined process, preparing by the same process with identical materials and identical processing conditions and under the same illumination conditions an approximately full color photographic record of an object having a neutral color of known spectral distribution, noting the departure of the record from a correct rendition of said neutral color, reproducing said photograph and controlling the relative amounts of the primary colors in the reproduction in accordance with the amount of said departure.

5. The method of reproducing a multi-colored original as it would appear in white light which comprises preparing a positive colored photograph of the original under given illumination conditions and by a predetermined process, preparing by the same process with identical materials and identical processing conditions and under the same illumination conditions an approximately natural color photographic record of an object having a neutral color of known spectral distribution, noting the departure of the record from said neutral color, duplicating said positive photograph and controlling the relative amounts of the primary colors in the duplicate in accordance with the amount of said departure.

6. The method of reproducing a multi-colored original as it would appear in white light which comprises preparing a negative colored photograph of the original under given illumination conditions and by a predetermined process, preparing by the same process with identical materials and identical processing conditions and under the same illumination conditions an approximately full color negative photographic record of an object having a neutral color of known spectral distribution, noting the departure of the record from a correct negative rendition of said neutral color, printing a positive from this negative and controlling the relative amounts of the primary colors in the positive in accordance with the amounts of said departure.

7. The method of reproducing a multi-colored photograph prepared by a predetermined process which comprises preparing by the same process with identical materials and identical processing conditions an approximately full color photographic record of a neutral colored light of known spectral distribution, illuminating the record with light including the three primary colors, producing from the photograph three color separation positive images in register, and controlling the relative intensities of the three images in accordance with the relative intensities of the three primary colors from the record.

8. The method of duplicating a positive multi-colored photograph prepared by a predetermined process which comprises preparing by the same process with identical materials and identical processing conditions an approximately natural color photographic record of a neutral colored light of known spectral distribution, illuminating the record with light including the three primary colors, producing from the positive photograph three color separation negative images, producing from these negative images positive images in register and during at least one of the image producing steps, controlling the relative intensities of the three images in accordance with the relative intensities of the three primary colors from the record.

9. The method of printing a positive from a negative multi-colored photograph prepared by a predetermined process which comprises preparing by the same process with identical materials and identical processing conditions an approximately full color negative photographic record of a neutral colored light of known spectral distribution, illuminating the record with light including the three primary colors, printing from the photograph three color separation positive images in register and controlling the relative intensities of the three images directly in accordance with the relative intensities of the three primary colors from the record.

10. The method of reproducing a multi-colored original as it would appear in white light which comprises preparing a colored photograph of the original under given illumination conditions and by a predetermined process, preparing by the same process with identical materials and identical processing conditions under the same illumination conditions an approximately full color photographic record of an object having neutral color of known spectral distribution, illuminating the record with light including the three primary colors, producing from the photograph three colored separation positives in register and controlling the relative intensities of the three images in accordance with the intensities of the three primary colors from the record.

11. The method of reproducing a multi-colored photograph prepared by a predetermined process which comprises preparing by the same process with identical materials and identical processing conditions an approximately full color photographic record of a neutral colored light of known spectral distribution, illuminating the record with light including the three primary colors, establishing electric energies corresponding to the intensities of the three colors from the record, producing from the photograph three colored separation positive images in register and controlling the relative intensities of the three images in accordance with the corresponding electric energies.

12. The method of duplicating a positive colored photograph prepared by a predetermined process which comprises preparing by the same process with identical materials and identical processing conditions an approximately natural color photographic record of a neutral colored light of known spectral distribution, illuminating the record with light including the three primary colors, establishing electric energies corresponding to the intensities of the three colors from the record, producing from the photograph three colored separation negative images, producing from these negative images positive images in register and controlling the relative intensities of the three positive images inversely in accordance with the corresponding electric energies.

13. The method of printing a positive from a negative multi-colored photograph prepared by a predetermined process which comprises preparing by the same process with identical materials and identical processing conditions an approximately full color negative photographic record of a neutral colored light of known spectral distribution, illuminating the record with light including the three primary colors, establishing electric energies corresponding to the intensities of the three colors from the record, printing from the photograph three colored separation positive images in register and controlling the relative intensities of the three images directly in accordance with the corresponding electric energies.

14. The method of reproducing a multi-colored original as it would appear in white light which comprises preparing a colored photograph of the original under given illumination conditions and by a predetermined process, preparing by the same process with identical materials and identical processing conditions and under the same illumination conditions an approximately full color photographic record of an object having neutral color of known spectral distribution, illuminating the record with light including the three primary colors, establishing electric energies corresponding to the intensities of the three colors from the record, producing from the photograph three colored separation positives in register and controlling the relative intensities of the three images in accordance with the corresponding electric energies.

15. The method of reproducing a multi-colored photograph prepared by a predetermined process which comprises preparing by the same process with identical materials and identical processing conditions an approximately full color photographic record of gray light, noting the departure of the record from a correct rendition of gray, reproducing said photograph and controlling the relative amounts of the primary colors in the reproduction in accordance with the amount of said departure.

16. The method of duplicating a positive multi-colored photograph prepared by a predetermined process which comprises preparing by the same process with identical materials and identical processing conditions an approximately natural color photographic record of gray light, noting the departure of the record from gray, duplicating said photograph and controlling the relative amounts of the primary colors in the duplicate in accordance with the amount of said departure.

17. The method of printing a positive from a negative multi-colored photograph prepared by a predetermined process which comprises preparing by the same process with identical materials and identical processing conditions an approximately full color negative photographic record of gray light, noting the departure of the record from a correct negative rendition of gray, printing said positive from the negative and controlling the relative amounts of the primary colors in the positive in accordance with the amount of said departure.

18. The method of reproducing a multi-colored original as it would appear in white light which comprises preparing a colored photograph of the original under given illumination conditions and by a predetermined process, preparing by the same process with identical materials and identical processing conditions and under the same illumination conditions an approximately full color photographic record of a gray object, noting the departure of the record from a correct rendition of gray, reproducing said photograph and controlling the relative amounts of the primary colors in the reproduction in accordance with the amount of said departure.

19. The method of duplicating a colored motion picture film prepared by a predetermined process which comprises preparing by the same process and adjacent to the picture area on the film an approximately natural color photographic record of a gray light, scanning the record with the three primary colors, controlling the relative intensities of the three primary colors in the duplicating light inversely in accordance with the intensities of the corresponding colors from the record.

20. The method of reproducing a colored motion picture film prepared by a predetermined process which comprises preparing by the same process and adjacent to the picture area on the film an approximately full color photographic record of a gray light, printing three separate sensitive layers from the film through three primary color filters to form color separation negatives, scanning the record with the three primary colors and controlling the relative intensities of the printing exposures inversely in accordance with the intensities of the corresponding colors from the record.

21. The method of reproducing a multi-colored photograph prepared by a predetermined process which comprises preparing by the same process with identical materials and identical processing conditions an approximately full color photographic record of light of known spectral distribution, noting the departure of the record from a correct rendition of said distribution, recolor-photographing said photograph, color processing the recolor-photograph and controlling said color processing in accordance with said departure.

22. The method of reproducing a multicolored photograph prepared on a color photographic material by a predetermined process which comprises preparing on the same material to one side of the photograph area simultaneously with the preparation of said photograph and by the same process an approximately full color photographic record of neutral light of known spectral distribution, scanning the record with the three primary colors, reproducing the photograph and controlling the relative amounts of the primary colors in the reproduction in accordance with the corresponding colors from the record.

RICHARD S. MORSE.